US012184389B2

United States Patent
Zhang et al.

(10) Patent No.: US 12,184,389 B2
(45) Date of Patent: Dec. 31, 2024

(54) SPACE-AIR-GROUND INTEGRATED UAV-ASSISTED IOT DATA COLLECTIONCOLLECTION METHOD BASED ON AOI

(71) Applicant: Dongguan University Of Technology, Guangdong (CN)

(72) Inventors: Guobin Zhang, Guangdong (CN); Xin Wei, Guangdong (CN); Tiezhu Zhao, Guangdong (CN)

(73) Assignee: Dongguan University of Technology, Guangdong (CN)

( * ) Notice: Subject to any disclaimer, the term of this patent is extended or adjusted under 35 U.S.C. 154(b) by 337 days.

(21) Appl. No.: 17/882,619

(22) Filed: Aug. 8, 2022

(65) Prior Publication Data

US 2023/0239037 A1  Jul. 27, 2023

(30) Foreign Application Priority Data

Jan. 24, 2022 (CN) .......................... 202210077304.2

(51) Int. Cl.
*H04W 28/20* (2009.01)
*H04B 7/185* (2006.01)
*H04B 7/204* (2006.01)

(52) U.S. Cl.
CPC ..... *H04B 7/18508* (2013.01); *H04B 7/18504* (2013.01); *H04B 7/2041* (2013.01); *H04W 28/20* (2013.01)

(58) Field of Classification Search
CPC .......................... H04W 28/20; H04B 7/18504
See application file for complete search history.

(56) References Cited

U.S. PATENT DOCUMENTS

| 2021/0165405 | A1* | 6/2021 | Hong | .......... G05D 1/0027 |
| 2023/0353235 | A1* | 11/2023 | Kim | .......... H04B 7/18506 |
| 2023/0353982 | A1* | 11/2023 | Routt | .......... G06N 3/045 |
| 2024/0201309 | A1* | 6/2024 | Rico Alvarino | .......... G08G 5/0069 |

* cited by examiner

*Primary Examiner* — Barry W Taylor
(74) *Attorney, Agent, or Firm* — Jeenam Park

(57) ABSTRACT

A space-air-ground integrated UAV-assisted IoT data collection method based on AoI comprises: constructing a UAV-assisted space-air-ground integrated IoT system, constructing a UAV channel model and an AoI model, establishing an AoI-based UAV-assisted space-air-ground integrated IoT data collection model, transforming a problem into a Markov problem, introducing a neural network to solve a high-dimensional state problem, introducing a deep reinforcement learning algorithm to train UAVs to find optimal collection points, and introducing a matching theory to match the UAVs and IoT devices. To meet the requirement for the timeliness of information collection, the invention finds the optimal configuration of flight parameters of UAVs and deduces the restrictive relation between performance indicators such as AoI, system capacity and energy utilization rate, thus effectively improving the timeliness of information collection, reducing the management and control complexity of the system, and improving the application level of AI in the IoT field.

8 Claims, 2 Drawing Sheets

SPACE-AIR-GROUND INTEGRATED UAV-ASSISTED IOT DATA COLLECTIONCOLLECTION METHOD BASED ON AOI

BACKGROUND OF THE INVENTION

The invention relates to a data collection method, in particular to a space-air-ground integrated UAV-assisted IoT data collection method based on AoI, and belongs to the technical field of wireless communication.

The wide-area Internet of Things (IoT) will become increasingly popular in 5G and forthcoming 6G communication. IoT, as an important third information technology after the computer and the Internet, has developed rapidly in recent years. The most significant characteristic of IoT is to effectively connect objects based on the sensor technology to realize monitoring of the objects and collection and transmission of information, so as to promote social and economic development and people's communication. With the rapid development of the wireless technology, wireless sensors will be used more and more widely in the industrial field, the agricultural field, the traffic field, the logistics field, and the like. To fulfill extensive coverage and flexible data collection, a satellite, UAVs and IoT devices are combined, as shown in FIG. 1, to form a space-air-ground integrated network (SAGIN), which is considered as a major trend of 6G wireless communication. In this framework, the UAVs, as repeaters, transmit data of the IoT devices to the satellite, so that the data transmission rate is greatly increased.

Space-air-ground integration has been construed as the potential key technology and important feature of 6G systems. In the prior art, UAVs have been used for aerial base stations, mobile repeaters and return in wireless communication. To measure the freshness of IoT information, Kaul initially puts forward age of information (AoI), which has been used in existing study to define the freshness of data packages collected by a UAV-assisted SAGIN, and also puts forward the scheme of joint optimization based on a UAV cellular internet to minimize AoI.

In recent years, multiple networking techniques for the SAGIN have been put forward. However, existing solutions for path planning of UAVs have the problems of high computation complexity and great limitations. With the development of artificial intelligence (AI), deep reinforcement learning starts to be widely used for performance optimization of wireless communication, and multiple training methods such as deep Q network and deep deterministic policy gradient are used to improve the optimization performance. Nevertheless, the study of path planning of UAVs based on deep reinforcement learning still has the following limitations:

1. In the space-air-ground integrated system, UAVs are used as repeaters to transmit data, and during data collection, the flight path of the UAVs has an important influence on the freshness of data; however, existing solutions to path planning of the UAVs are excessively high in computation complexity, and the solving process may fall into local optimization too early.

2. In an existing system model, to realize data transmission between multiple UAVs and IoT devices involves, the UAVs should match the IoT devices. Most existing study only focuses on path optimization of the UAVs or matching between UAVs and the IoT devices, but fails to take these two into consideration and design, and there are few techniques that combine deep reinforcement learning and the matching theory.

3. With the extension of the distribution of IoT devices on the ground, the coordination between multiple UAVs is enhanced and will exert a direct influence on overall AoI of the system. Existing techniques discuss the optimization of the system within a constant range, and techniques that establish dynamic distribution of information point data and use UAVs as intelligent agents for distributed learning are hardly available.

BRIEF SUMMARY OF THE INVENTION

The technical issue to be settled by the invention is to provide a space-air-ground integrated UAV-assisted IoT data collection method based on AoI to improve the timeliness of information collection, reduce the management and control complexity of a system and improve the application level of AI in the IoT field.

The technical solution adopted by the invention to settle the above technical issues is as follows:

A space-air-ground integrated UAV-assisted IoT data collection method based on AoI comprises the following steps:

Step 1: constructing a UAV-assisted space-air-ground integrated IoT system;

Step 2: constructing a UAV channel model and an AoI model;

Step 3: establishing an AoI-based UAV-assisted space-air-ground integrated IoT data collection model;

Step 4: transforming a problem into a Markov problem;

Step 5: introducing a neural network to solve a high-dimensional state problem;

Step 6: introducing a deep reinforcement learning algorithm to train UAVs to find optimal collection points; and Step 7: introducing a matching theory to match the UAVs and IoT devices.

Further, in Step 1, the UAV-assisted space-air-ground integrated IoT system is constructed, wherein the UAV-assisted space-air-ground integrated IoT system comprises a low earth orbit satellite, the low earth orbit satellite is connected to multiple UAVs, the multiple UAVs are connected to multiple IoT devices, data generated by the IoT devices is randomly distributed by time, the size of the data follows Poisson distribution, each UAV flies from an initial location to a preset location to collect data and transmits the collected data to the satellite, and the UAVs are configured in a hovering mode during data collection.

Further, in Step 2,

Data transmission between the UAVs and the IoT devices is based on line-of-sight, and a path loss between the UAV n and the IoT device m is:

$$PL_{m,n} = 20\log(d_{m,n}) + 20\log(f) + 20\log\left(\frac{4\pi}{c}\right) + \eta_{LoS}$$

Wherein, $d_{m,n}$ indicates a distance from the UAV n to the IoT device m, f represents a center frequency, c represents a speed of light, and $\eta_{LoS}$ represents an additive loss due to shadowing and scattering caused by man-made structures;

A signal plus noise ratio from the IoT device m to the UAV n is expressed as:

$$\Gamma_{m,n} = \frac{p_m PL_{m,n}^2}{\sigma^2},$$

Wherein, $p_m$ represents power from the IoT device m to the UAV n, and $\sigma^2$ represents Gaussian white noise power;

A transmission rate from the IoT device m to the UAV n is calculated by:

$$R_{m,n}=B\log_2(1+\Gamma_{m,n})$$

Wherein, B represents a bandwidth;

AoI is introduced to describe the freshness of sensing data received by the UAVs; assume when a first matching IoT device generates data, the UAVs start to fly towards a final location; other matching IoT devices generate data randomly in a UAV flight time; when arriving at a target location, the UAVs start to send data; so, the AoI is composed of the UAV flight time and a transmission time from the IoT devices to the UAVs;

The AoI of data received from the IoT device m in a time t is expressed as $A_m(t)$:

$$A_m(t)=t-u_m(t)$$

$u_m(t)$ represents a time when the IoT device m generates data.

Further, in Step 3,

A system AoI minimization problem to be solved is summarized as an optimization problem:

$$\min_{b_{m,n}^t, x_t^U, y_t^U} \sum_{m=1}^M A_m(t)$$

s.t. C1: $b_{m,n}^t \in \{0, 1\}$,

C2: $\sum_{m=1}^M b_{m,n}^t \geq 1, \forall n$,

C3: $\sum_{n=1}^N b_{m,n}^t \geq 1, \forall m$,

C4: $0 \leq \sqrt{x_t^{U2}+y_t^{U2}} \leq S$

Wherein, $b_{m,n}^t$ is a matching variable of the UAV n and the IoT device m at the time t, and $x_t^U$ and $y_t^U$ respectively represent a horizontal coordinate and a vertical coordinate of a flight location of the UAVs at the time t; under constraint C1 which represents direct matching between the UAV n and the IoT device m, $b_{m,n}^t$ is 1, otherwise, $b_{m,n}^t$ is 0; constraint C2 and constraint C3 represent point-to-multipoint matching between the UAVs and the IoT devices; constraint C4 represents a UAV flying area with radius S.

Further, in Step 4, a framework combining deep reinforcement learning and a matching algorithm is constructed to find data collection positions and matching information of the UAVs; during a matching process, agents are expressed as $V=\{V_k|\forall k\in M\}$, a virtual agent is introduced into each UAV to realize point-to-multipoint data collection, and each agent matches one IoT device;

The UAVs fly at a same height, the deep reinforcement learning is used for training positions of the UAVs, and in the deep reinforcement learning, the agents interact with an environment to obtain an optimal strategy;

A Markov decision process is composed of a quaternion <S,A,P,R>, where S, A, P and R respectively denote a state space, an action space, a state transition probability and a reward;

State: $s_t=(x_t^U, y_t^U)$, $s_t \in S$, denotes the position of the UAVs at the time t;

Action: $a_t=(d_t, \theta_t)$, $a_t \in A$, where $d_t$ and $\theta_t$ respectively represent a flight distance and a flight direction of the UAVs at the time t, and are discretized to limit selections;

Reward: $r_t$ is defined as negative AoI at the time t, and $r_t=-A_m(t)$;

To minimize overall AoI of the network, minimum AoI between each agent and the corresponding IoT device is explored with an optimal UAV position, so the optimization problem is transformed into a problem of maximizing a cumulative reward:

$$\max_{x_t^U, y_t^U} \sum_{t=0}^\infty \gamma^t r_t,$$

s.t. C4

Wherein, $\gamma \in [0,1]$ is a discount factor for future rewards;

Under a policy $\pi$, a Q-value function used for selecting an action $a_t$ in a state $s_t$ is defined as:

$$Q^\pi(s_t,a_t)=E_{s_{t+1}}[r_t+\gamma Q^\pi(s_{t+1},a_{t+1})|s_t,a_t]$$

An optimal action-state value $Q^*(s_t,a_t)$ is defined as an optimal return obtained by taking the action under the state $s_t$;

According to a Bellman equation, $Q^*(s_t,a_t)$ is expressed as:

$$Q^*(s_t, a_t) = \max_\pi Q^\pi(s_t, a_t)$$

The optimal strategy is obtained as follows:

$$\pi^* = \underset{a_t \in A}{\operatorname{argmax}} Q^*(s_t, a_t) \circ$$

Further, in Step 5,

Deep reinforcement learning is used to solve the problem of a high-dimensional state space of the system model; experience replay and a target network are introduced in a deep Q network, and in the experience replay mechanism, a sequence $<s_t,a_t,r_t,s_{t+1}>$ of the interaction between the agents and the environment is stored in an experience replay buffer D; during the learning process, a mini-batch sequence is uniformly sampled from D, and the deep Q network is trained by means of stochastic gradient descent to approximate a Q function in high-dimensional state spaces; the neural network is parameterized by $\theta$ to approximate the Q as:

$$Q^*(s_t,a_t) \approx \hat{Q}(s_t,a_t;\theta)$$

A loss function of the neural network is defined for the stochastic gradient descent, which is expressed as:

$$L(\theta) = E\left[\left(r_t + \gamma \max_{a_{t+1}} Q(s_{t+1}, a_{t+1}; \theta^-) - Q(s_t, a_t; \theta)\right)^2\right]$$

Wherein, $\theta^-$ and $\theta$ respectively represent parameters of a separate target network and an online network.

Further, in Step 6,

To find the optimal collection points of the UAVs, an SAC algorithm is used for training; the SAC algorithm adopts a stochastic strategy, which is implemented by means of maximum entropy, so that any useful behaviors or paths will not be neglected; the agents develop more feasible solutions to explore the state space more fully, so as to complete a task with better optimization performance and learning efficiency;

The optimal strategy is achieved by using an entropy as:

$$\pi^* = \arg\max_{\pi} \sum_t E_{(s_t,a_t) \sim \rho_\pi}[r(s_t, a_t) + \alpha H(\pi(\cdot \mid s_t))]$$

Wherein, $H(\pi(\bullet|s_t))=E_{a_t}[-\log \pi(a_t|s_t)]$ is a policy entropy, and a represents a temperature parameter which balances the importance of the entropy against the system reward;

A state value function $V(s_t)$ and an action-state value function $Q(s_t,a_t)$ are expressed as:

$$V(s_t)=E_{a_t \sim \pi}[Q(s_t,a_t)-\alpha \log \pi(a_t|s_t)]$$

$$Q(s_t,a_t)=r(s_t,a_t)+\gamma E_{s_{t+1} \sim \rho}[V(s_{t+1})]$$

The algorithm constructs two action-state functions $Q_{\theta_i}(s_t,a_t)$, $i \in \{1,2\}$ and policies $\pi_\phi$ with parameters $\theta$ and $\phi$; at each time step, an actor network and a critic network sample a small batch of sequences from the experience replay buffer for updating;

A loss function for the critic network is as follows:

$$J_Q(\theta_i) = E_{(s_t,a_t) \sim D}\left[\frac{1}{2}Q_{\theta_i}(s_t, a_t) - \hat{Q}(s_t, a_t)\right]^2$$

Wherein, $\hat{Q}(s_t,a_t)$ is defined as:

$$\hat{Q}(s_t,a_t)=r(s_t,a_t)+\gamma E_{s_{t+1} \sim \rho}[V_{\hat{\theta}_i}(s_{t+1})]$$

When the policies $\pi_\phi$ are trained, a loss function for the actor network is:

$$J_\pi(\phi)=E_{s_t \sim D}[E_{a_t \sim \pi_\phi}[\alpha \log(\pi_\phi(a_t|s_t))-Q_{\theta_i}(s_t,a_t)]]$$

Because the temperature parameter α plays an important role in training, an automatic entropy adjustment scheme is employed; in an initial space exploration of the UAVs, α is increased to explore more spaces and is then decreased with the reduction of the space exploration, and a temperature loss is minimized by:

$$J(\alpha)=E_{a_t \sim \pi_t}[-\alpha \log \pi_t(a_t|\pi_t)-\alpha H_0]$$

After training, the agents obtain minimum AoI between the UAVs and each IoT device and transmit the minimum AoI to the satellite for matching.

Further, in Step 7,

According to received AoI values, the satellite constructs preference lists $P\ L_k^V$ and $P\ L_m^I$ for each agent and the corresponding IoT device in an increasing order of the AoI, and then pairs the UAVs and the IoT devices through a GS algorithm; to ensure a same location of the agents of the UAVs, the agent with minimum AoI is selected as a primary agent, and auxiliary agents select the IoT device nearest to a training position of the primary agent;

The GS algorithm has a propose rule and a reject rule, which are respectively as follows:

Definition 1: propose rule: the agent $V_k \in V$ files a connection application with a favorite IoT device in a preference list $P\ L_k^V$;

Definition 2: reject rule: in presence of a better matching candidate, the IoT device $I_m \in I$ receiving the connection application will reject the agent; otherwise, the agent will be reserved as a matching candidate;

According to the rules, the GS algorithm comprises the following matching steps:

(1) Dividing V into a primary agent set $V^P$ and an auxiliary agent set $V^A$; and
(2) Filing, by each primary agent, a connection application with a favorite IoT device in the preference list of the primary agent; then selecting, by each IoT device, the agent that most prefers the IoT device, and rejecting other agents;

Each auxiliary agent $V_k^A$ adjusts its preference list according to a distance from a most favorable position to the corresponding primary agent obtained by learning, and then performs the process in Step (2) until stable matching is realized.

Compared with the prior art, the invention has the following advantages and effects:

1. The invention constructs the space-air-ground integrated model composed of a satellite, UAVs and IoT devices, the IoT devices sense environmental information, and the UAVs collect data and send the collected data to the satellite.

2. The AoI is calculated according to the UAV flight time and the data transmission time from the IoT devices to the UAVs, and a scheme combining deep reinforcement learning and matching game is put forward for path design of the UAVs and selection of the IoT devices to minimize the overall AoI, so that the timeliness of information collection is effectively improved, the management and control complexity of the system is reduced, and the application level of AI in the IoT field is improved, 3. To realize point-to-multipoint information collection, a virtual agent is introduced into each UAV and is trained through the SAC algorithm to realize the minimum AoI between each agent and the corresponding IoT device, and the satellite establishes preference lists to complete matching and determine the flight position of the UAVs, so that matching between the UAVs and the IoT devices is realized.

DETAILED DESCRIPTION OF THE INVENTION

To expound in detail the technical solutions adopted by the invention to fulfill desired technical purposes, the technical solutions of the embodiments of the invention will be clearly and completely described below in conjunction with the drawings of the embodiments of the invention. Obviously, the embodiments in the following description are merely illustrative ones, and are not all possible ones of the invention, and the technical means or technical features in the embodiments of the invention may be substituted without creative labor. The invention will be described in detail below with reference to the accompanying drawings and embodiments.

The invention provides a space-air-ground integrated UAV-assisted IoT data collection method based on AoI, comprising the following steps:

Step 1: a UAV-assisted space-air-ground integrated IoT system is constructed.

Figure 1:
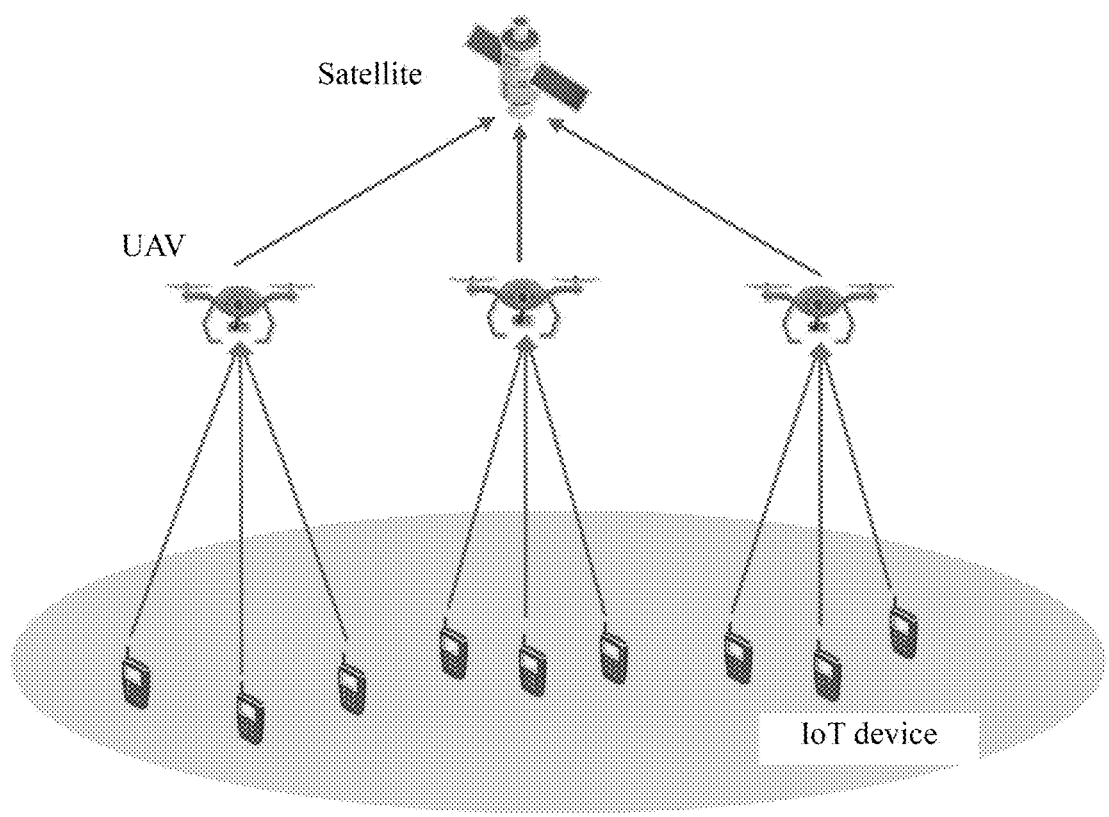
FIG. 1 is a schematic diagram of a UAV-assisted space-air-ground integrated IoT system according to the invention.

As shown in FIG. 1, the UAV-assisted space-air-ground integrated IoT system comprises a low earth orbit satellite, the low earth orbit satellite is connected to multiple UAVs, the multiple UAVs are connected to multiple IoT devices, data generated by the IoT devices is randomly distributed by time, the size of the data follows Poisson distribution, each UAV flies from an initial location to a preset location to collect data and transmits the collected data to the satellite, and the UAVs are configured in a hovering mode during data collection, so that links between the UAVs and the IoT devices are stable during data transmission.

Step 2: a UAV channel model and an AoI model are constructed.

Data transmission between the UAVs and the IoT devices is based on line-of-sight, and a path loss between the UAV n and the IoT device m is:

$$PL_{m,n} = 20\log(d_{m,n}) + 20\log(f) + 20\log\left(\frac{4\pi}{c}\right) + \eta_{LoS}$$

Wherein, $d_{m,n}$ indicates a distance from the UAV n to the IoT device m, f represents a center frequency, c represents a speed of light, and $\eta_{LoS}$ represents an additive loss due to shadowing and scattering caused by man-made structures;

A signal plus noise ratio from the IoT device m to the UAV n is expressed as:

$$\Gamma_{m,n} = \frac{p_m PL_{m,n}^2}{\sigma^2},$$

Wherein, $p_m$ represents power from the IoT device m to the UAV n, and $\sigma^2$ represents Gaussian white noise power;

A transmission rate from the IoT device m to the UAV n is calculated by:

$$R_{m,n} = B \log_2(1+\Gamma_{m,n})$$

Wherein, B represents a bandwidth;

AoI is introduced to describe the freshness of sensing data received by the UAVs; assume when a first matching IoT device generates data, the UAVs start to fly towards a final location; other matching IoT devices generate data randomly in a UAV flight time; when arriving at a target location, the UAVs start to send data; so, the AoI is composed of the UAV flight time (the time of waiting for data transmission) and a transmission time from the IoT devices to the UAVs;

The AoI of data received from the IoT device m in a time t is expressed as $A_m(t)$:

$$A_m(t) = t - u_m(t)$$

$u_m(t)$ represents a time when the IoT device m generates data.

Step 3: an AoI-based UAV-assisted space-air-ground integrated IoT data collection model is established.

A system AoI minimization problem to be solved is summarized as an optimization problem:

$$\min_{b_{m,n}^t, x_t^U, y_t^U} \sum_{m=1}^{M} A_m(t)$$

s.t. C1: $b_{m,n}^t \in \{0, 1\}$,

C2: $\sum_{m=1}^{M} b_{m,n}^t \geq 1, \forall n,$

C3: $\sum_{n=1}^{N} b_{m,n}^t \geq 1, \forall m,$

C4: $0 \leq \sqrt{x_t^{U2} + y_t^{U2}} \leq S$

Wherein, $b_{m,n}^t$ is a matching variable of the UAV n and the IoT device m at the time t, and $x_t^U$ and $y_t^U$ respectively represent a horizontal coordinate and a vertical coordinate of a flight location of the UAVs at the time t; constraint C2 and constraint C3 represent point-to-multipoint matching between the UAVs and the IoT devices; constraint C4 represents a UAV flying area with radius S.

Step 4: the problem is transformed into a Markov problem.

Figure 2:
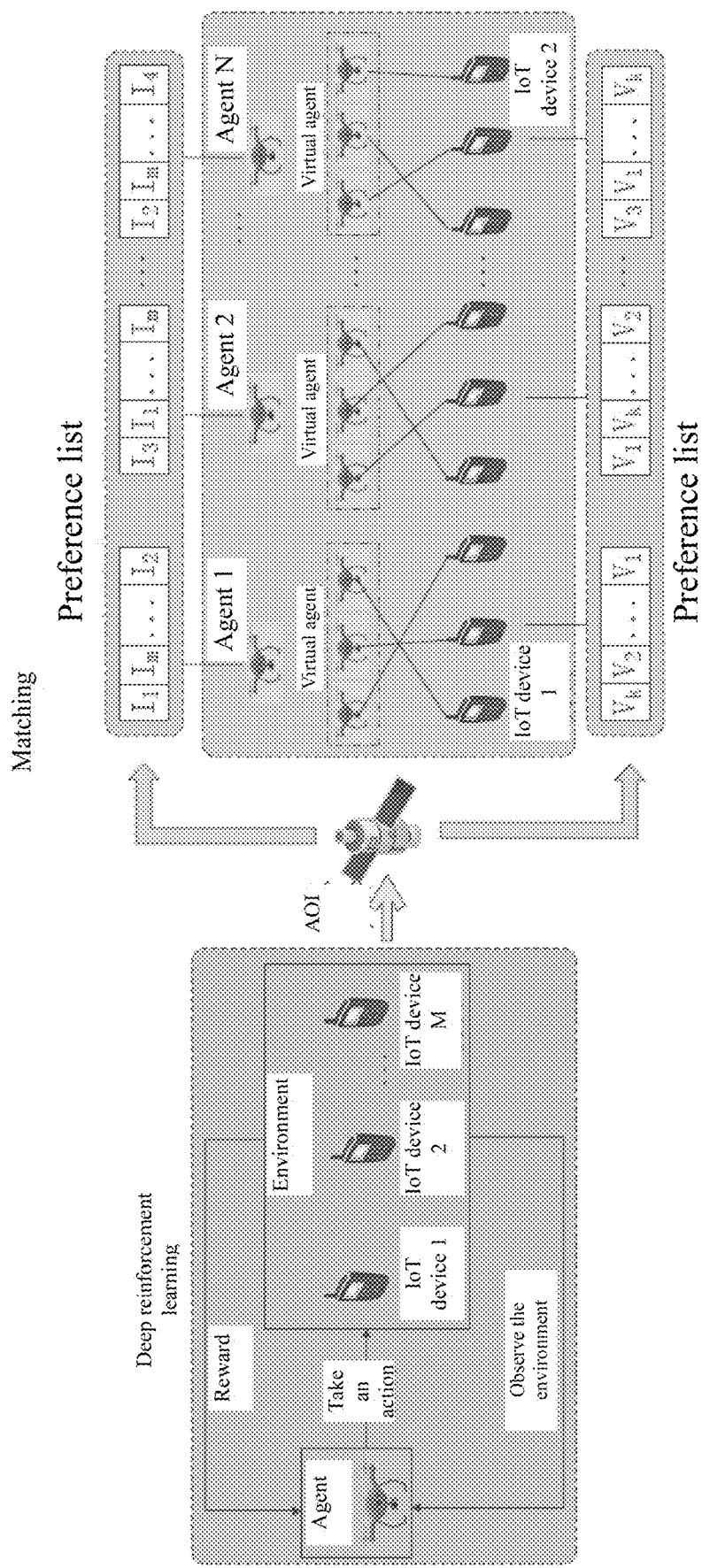
FIG. 2 is a schematic diagram of matching-based deep reinforcement learning according to the invention.

A framework combining deep reinforcement learning and a matching algorithm is constructed to find data collection positions and matching information of the UAVs; as shown in FIG. 2, a virtual agent is introduced into each UAV to realize point-to-multipoint data collection, and each agent matches one IoT device, so the agents are expressed as $V=\{V_k | \forall k \in M\}$.

In this scenario, the UAVs fly at a same height, the deep reinforcement learning is used for training positions of the UAVs, and in the deep reinforcement learning, the agents interact with an environment to obtain an optimal strategy so as to maximize a long-term gain.

A Markov decision process provides a theoretical framework for reinforcement learning and is composed of a quaternion <S,A,P,R>, where S, A, P and R respectively denote a state space, an action space, a state transition probability and a reward;

State: $s_t=(x_t^U, y_t^U)$, $s_t \in S$, denotes the position of the UAVs at the time t;

Action: $a_t=(d_t, \theta_t)$, $a_t \in A$, where $d_t$ and $\theta_t$ respectively represent a flight distance and a flight direction of the UAVs at the time t, and are discretized to limit selections;

Reward: $r_t$ s defined as negative AoI at the time t, and $r_t = A_m(t)$;

To minimize overall AoI of the network, minimum AoI between each agent and the corresponding IoT device is explored with an optimal UAV position, so the optimization problem is transformed into a problem of maximizing a cumulative reward:

$$\max_{x_t^U, y_t^U} \sum_{t=0}^{\infty} \gamma^t r_t,$$

s.t. C4

Wherein, $\gamma \in [0,1]$ is a discount factor for future rewards;

Under a policy π, a Q-value function used for selecting an action $a_t$ in a state $s_t$ is defined as:

$$Q^\pi(s_t, a_t) = E_{s_{t+1}}[r_t + \gamma Q^\pi(s_{t+1}, a_{t+1}) | s_t, a_t]$$

An optimal action-state value $Q^*(s_t, a_t)$ is defined as an optimal return obtained by taking the action under the state $s_t$, According to a Bellman equation, $Q^*(s_t, a_t)$ is expressed as:

$$Q^*(s_t, a_t) = \max_{\pi} Q^\pi(s_t, a_t)$$

The optimal strategy is obtained as follows:

$$\pi^* = \underset{a_t \in A}{\operatorname{argmax}} Q^*(s_t, a_t) \circ$$

Step 5: a neural network is introduced to solve a high-dimensional state problem Because traditional reinforcement learning cannot be applied to a large discrete space or a continuous state space, deep reinforcement learning is used to solve the problem of a high-dimensional state space of the system model. Experience replay and a target network are introduced in a deep Q network (DQN). In the experience replay mechanism, a sequence $<s_t, a_t, r_t, s_{t+1}>$ of the interaction between the agents and the environment is stored in an experience replay buffer D; during the learning process, a mini-batch sequence is uniformly sampled from D, and the deep Q network is trained by means of stochastic gradient descent to approximate a Q function in high-dimensional state spaces; the neural network is parameterized by $\theta$ to approximate the Q function as:

$$Q^*(s_t, a_t) \approx \hat{Q}(s_t, a_t; \theta)$$

A loss function of the neural network is defined for the stochastic gradient descent, which is expressed as:

$$L(\theta) = E\left[\left(r_t + \gamma \underset{a_{t+1}}{\max} Q(s_{t+1}, a_{t+1}; \theta^-) - Q(s_t, a_t; \theta)\right)^2\right]$$

Wherein, $\theta^-$ and $\theta$ respectively represent parameters of a separate target network and an online network.

Step 6: a deep reinforcement learning algorithm is introduced to train the UAVs to find optimal collection points The objective is to find the optimal collection points of the UAVs. However, due to the complexity of the change of AoI, multiple local optimal collection points may exist during the training process. In order to prevent the UAVs from falling into local optimization, a soft actor-critic (SAC) algorithm is used for training.

Compared with traditional deep reinforcement learning algorithms, the SAC algorithm, as a good deep reinforcement learning method, adopts a stochastic strategy, which has more practical advantages than a deterministic strategy during training. The random stochastic is implemented by means of maximum entropy, so that any useful behaviors or paths will not be neglected. The agents develop more feasible solutions to explore the state space more fully, so as to complete a task with better optimization performance and learning efficiency.

The optimal strategy is achieved by using an entropy as:

$$\pi^* = \underset{\pi}{\operatorname{argmax}} \sum_t E_{(s_t, a_t) \sim \rho_\pi}[r(s_t, a_t) + \alpha H(\pi(\cdot | s_t))]$$

Wherein, $H(\pi(\cdot | s_t)) = E_{a_t}[-\log \pi(a_t | s_t)]$ is a policy entropy, and $\alpha$ represents a temperature parameter which balances the importance of the entropy against the system reward, A state value function $V(s_t)$ and an action-state value function $Q(s_t, a_t)$ are expressed as:

$$V(s_t) = E_{a_t \sim \pi}[Q(s_t, a_t) - \alpha \log \pi(a_t | s_t)]$$

$$Q(s_t, a_t) = r(s_t, a_t) + \gamma E_{s_{t+1} \sim \rho}[V(s_{t+1})]$$

The algorithm constructs two action-state functions $Q_{\theta_i}(s_t, a_t)$, $i \in \{1,2\}$ and policies $\pi_\phi$ with parameters $\theta$ and $\phi$; at each time step, an actor network and a critic network sample a small batch of sequences from the experience replay buffer for updating;

A loss function for the critic network is as follows:

$$J_Q(\theta_i) = E_{(s_t, a_t) \sim D}\left[\frac{1}{2} Q_{\theta_i}(s_t, a_t) - \hat{Q}(s_t, a_t)\right]^2$$

Wherein, $\hat{Q}(s_t, a_t)$ is defined as:

$$\hat{Q}(s_t, a_t) = r(s_t, a_t) + \gamma E_{s_{t+1} \sim \rho}[V_{\theta_i}(s_{t+1})]$$

When the policies $\pi_\phi$ are trained, a loss function for the actor network is:

$$J_\pi(\phi) = E_{s_t \sim D}[E_{a_t \sim \pi_\phi}[\alpha \log(\pi_\phi(a_t | s_t)) - Q_{\theta_i}(s_t, a_t)]]$$

Because the temperature parameter $\alpha$ plays an important role in training, an automatic entropy adjustment scheme is employed; in an initial space exploration of the UAVs, $\alpha$ is increased to explore more spaces and is then decreased with the reduction of the space exploration, and a temperature loss is minimized by:

$$J(\alpha) = E_{a_t \sim \pi_t}[-\alpha \log \pi_t(a_t | \pi_t) - \alpha H_0]$$

After training, the agents obtain minimum AoI between the UAVs and each IoT device and transmit the minimum AoI to the satellite for matching.

Step 7: a matching theory is introduced to match the UAVs and IoT devices.

According to received AoI values, the satellite constructs preference lists $PL_k^V$ and $PL_m^I$ for each agent and the corresponding IoT device in an increasing order of the AoI, and then pairs the UAVs and the IoT devices through a Gale-Shapley (GS) algorithm; to ensure a same location of the agents of the UAVs, the agent with minimum AoI is selected as a primary agent, and auxiliary agents select the IoT device nearest to a training position of the primary agent;

The GS algorithm has a propose rule and a reject rule, which are respectively as follows:
  Definition 1: propose rule: the agent $V_k \in V$ files a connection application with a favorite IoT device in a preference list $PL_k^V$;
  Definition 2: reject rule: in presence of a better matching candidate, the IoT device $I_m \in I$ receiving the connection application will reject the agent; otherwise, the agent will be reserved as a matching candidate;

According to the rules, the GS algorithm comprises the following matching steps:
  (1) V is divided into a primary agent set $V^P$ and an auxiliary agent set $V^A$; and
  (2) Each primary agent files a connection application with a favorite IoT device in the preference list of the primary agent, and then each IoT device selects the agent that most prefers the IoT device, and rejects other agents;

Each auxiliary agent $V_k^A$ adjusts its preference list according to a distance from a most favorable position to the corresponding primary agent obtained by learning, and then performs the process in Step (2) until stable matching is realized.

The above embodiments are merely preferred ones of the invention, and are not intended to limit the invention in any form. Although the invention has been disclosed above with reference to the preferred embodiments, these embodiments are not used to limit the invention. Any skilled in the art can obtain equivalent embodiments by slightly changing or modifying the technical contents disclosed above without departing from the scope of the technical solutions of the invention. Any simple amendments, equivalent substitutions and improvements made to the above embodiments based on the spirit and principle of the invention according to the technical essence of the invention should still fall within the protection scope of the technical solutions of the invention.

What is claimed is:

1. A space-air-ground integrated UAV-assisted IoT data collection method based on AoI, comprising the following steps:
   Step 1: constructing a UAV-assisted space-air-ground integrated IoT system;
   Step 2: constructing a UAV channel model and an AoI model;
   Step 3: establishing an AoI-based UAV-assisted space-air-ground integrated IoT data collection model;
   Step 4: transforming a problem into a Markov problem;
   Step 5: introducing a neural network to solve a high-dimensional state problem;
   Step 6: introducing a deep reinforcement learning algorithm to train UAVs to find optimal collection points; and
   Step 7: introducing a matching theory to match the UAVs and IoT devices.

2. The space-air-ground integrated UAV-assisted IoT data collection method based on AoI according to claim 1, wherein in Step 1, the UAV-assisted space-air-ground integrated IoT system is constructed, the UAV-assisted space-air-ground integrated IoT system comprises a low earth orbit satellite, the low earth orbit satellite is connected to multiple UAVs, the multiple UAVs are connected to multiple IoT devices, data generated by the IoT devices is randomly distributed by time, the size of the data follows Poisson distribution, each UAV flies from an initial location to a preset location to collect data and transmits the collected data to the satellite, and the UAVs are configured in a hovering mode during data collection.

3. The space-air-ground integrated UAV-assisted IoT data collection method based on AoI according to claim 1, wherein in Step 2,
   data transmission between the UAVs and the IoT devices is based on line-of-sight, and a path loss between the UAV n and the IoT device m is:

$$PL_{m,n} = 20\log(d_{m,n}) + 20\log(f) + 20\log\left(\frac{4\pi}{c}\right) + \eta_{LoS}$$

wherein, $d_{m,n}$ indicates a distance from the UAV n to the IoT device m, f represents a center frequency, c represents a speed of light, and $\eta_{LoS}$ represents an additive loss due to shadowing and scattering caused by man-made structures;
   a signal plus noise ratio from the IoT device m to the UAV n is expressed as:

$$\Gamma_{m,n} = \frac{p_m PL_{m,n}^2}{\sigma^2},$$

wherein, $p_m$ represents power from the IoT device m to the UAV n, and $\sigma^2$ represents Gaussian white noise power;
   a transmission rate from the IoT device m to the UAV n is calculated by:

$$R_{m,n} = B\log_2(1+\Gamma_{m,n})$$

wherein, B represents a bandwidth;
   AoI is introduced to describe the freshness of sensing data received by the UAVs;
   assume when a first matching IoT device generates data, the UAVs start to fly towards a final location; other matching IoT devices generate data randomly in a UAV flight time; when arriving at a target location, the UAVs start to send data; so, the AoI is composed of the UAV flight time and a transmission time from the IoT devices to the UAVs;
   the AoI of data received from the IoT device m in a time t is expressed as $A_m(t)$:

$$A_m(t) = t - u_m(t)$$

$u_m(t)$ represents a time when the IoT device m generates data.

4. The space-air-ground integrated UAV-assisted IoT data collection method based on AoI according to claim 1, wherein in Step 3,
   a system AoI minimization problem to be solved is summarized as an optimization problem:

$$\min_{b_{m,n}^t, x_t^U, y_t^U} \sum_{m=1}^{M} A_m(t)$$

$$\text{s.t.} \quad C1: b_{m,n}^t \in \{0, 1\},$$

$$C2: \sum_{m=1}^{M} b_{m,n}^t \geq 1, \forall n,$$

$$C3: \sum_{n=1}^{N} b_{m,n}^t \geq 1, \forall m,$$

$$C4: 0 \leq \sqrt{x_t^{U2} + y_t^{U2}} \leq S$$

wherein, $b_{m,n}^t$ is a matching variable of the UAV n and the IoT device m at the time t, and $x_t^U$ and $y_t^U$ respectively represent a horizontal coordinate and a vertical coordinate of a flight location of the UAVs at the time t; under constraint C1 which represents direct matching between the UAV n and the IoT device m, $b_{m,n}^t$ is 1, otherwise, $b_{m,n}^t$ is 0; constraint C2 and constraint C3 represent point-to-multipoint matching between the UAVs and the IoT devices; constraint C4 represents a UAV flying area with radius S.

5. The space-air-ground integrated UAV-assisted IoT data collection method based on AoI according to claim 1, wherein in Step 4, a framework combining deep reinforcement learning and a matching algorithm is constructed to find data collection positions and matching information of the UAVs; during a matching process, agents are expressed as $V = \{V_k | \forall k \in M\}$, a virtual agent is introduced into each UAV to realize point-to-multipoint data collection, and each agent matches one IoT device; the UAVs fly at a same height, the deep reinforcement learning is used for training positions of the UAVs, and in the deep reinforcement learning, the agents interact with an environment to obtain an optimal strategy;
   a Markov decision process is composed of a quaternion <S,A,P,R>, where S, A, P and R respectively denote a state space, an action space, a state transition probability and a reward;

state: $s_t=(x_t^U, y_t^U)$, $s_t \in S$, denotes the position of the UAVs at the time t;

action: $a_t=(d_t, \theta_t)$, $a_t \in A$, where $d_t$ and $\theta_t$ respectively represent a flight distance and a flight direction of the UAVs at the time t, and are discretized to limit selections; reward: $r_t$ is defined as negative AoI at the time t, and $r_t = A_m(t)$;

to minimize overall AoI of the network, minimum AoI between each agent and the corresponding IoT device is explored with an optimal UAV position, so the optimization problem is transformed into a problem of maximizing a cumulative reward:

$$\max_{x_t^U, y_t^U} \sum_{t=0}^{\infty} \gamma^t r_t,$$

s.t. C4 wherein, $\gamma \in [0,1]$ is a discount factor for future rewards;
under a policy $\pi$, a Q-value function used for selecting an action $a_t$ in a state $s_t$ is defined as:

$$Q^\pi(s_t,a_t)=E_{s_{t+1}}[r_t+\gamma Q^\pi(s_{t+1},a_{t+1})|s_t,a_t]$$

an optimal action-state value $Q^*(s_t,a_t)$ is defined as an optimal return obtained by taking the action under the state $s_t$,
according to a Bellman equation, $Q^*(s_t,a_t)$ is expressed as:

$$Q^*(s_t, a_t) = \max_\pi Q^\pi(s_t, a_t)$$

the optimal strategy is obtained as follows:

$$\pi^* = \underset{a_t \in A}{\operatorname{argmax}} Q^*(s_t, a_t) \circ$$

6. The space-air-ground integrated UAV-assisted IoT data collection method based on AoI according to claim 1, wherein in Step 5,
deep reinforcement learning is used to solve the problem of a high-dimensional state space of the system model; experience replay and a target network are introduced in a deep Q network, and in the experience replay mechanism, a sequence $<s_t,a_t,r_t,s_{t+1}>$ of the interaction between the agents and the environment is stored in an experience replay buffer D; during the learning process, a mini-batch sequence is uniformly sampled from D, and the deep Q network is trained by means of stochastic gradient descent to approximate a Q function in high-dimensional state spaces; the neural network is parameterized by $\theta$ to approximate the Q function as:

$$Q^*(s_t,a_t) \approx \hat{Q}(s_t,a_t;\theta)$$

a loss function of the neural network is defined for the stochastic gradient descent, which is expressed as:

$$L(\theta) = E\left[\left(r_t + \gamma \max_{a_{t+1}} Q(s_{t+1}, a_{t+1}; \theta^-) - Q(s_t, a_t; \theta)\right)^2\right]$$

wherein, $\theta^-$ and $\theta$ respectively represent parameters of a separate target network and an online network.

7. The space-air-ground integrated UAV-assisted IoT data collection method based on AoI according to claim 1, wherein in Step 6,
to find the optimal collection points of the UAVs, an SAC algorithm is used for training; the SAC algorithm adopts a stochastic strategy, which is implemented by means of maximum entropy, so that any useful behaviors or paths will not be neglected; the agents develop more feasible solutions to explore the state space more fully, so as to complete a task with better optimization performance and learning efficiency;
an optimal strategy achieved by using an entropy as:

$$\pi^* = \underset{\pi}{\operatorname{argmax}} \sum_t E_{(s_t,a_t) \sim \rho_\pi}[r(s_t, a_t) + \alpha H(\pi(\cdot|s_t))]$$

wherein, $H(\pi(\cdot|s_t))=E_{a_t}[-\log \pi(a_t|s_t)]$ is a policy entropy, and $\alpha$ represents a temperature parameter which balances the importance of the entropy against the system reward;
a state value function $V(s_t)$ and an action-state value function $Q(s_t,a_t)$ are expressed as:

$$V(s_t)=E_{a_t \sim \pi}[Q(s_t,a_t)-\alpha \log \pi(a_t|s_t)]$$

$$Q(s_t,a_t)=r(s_t,a_t)+\gamma E_{s_{t+1} \sim \rho}[V(s_{t+1})]$$

the algorithm constructs two action-state functions $Q_{\theta_i}(s_t, a_t)$, $i \in \{1,2\}$ and policies $\pi_\phi$ with parameters $\theta$ and $\phi$; at each time step, an actor network and a critic network sample a small batch of sequences from an experience replay buffer for updating;
a loss function for the critic network is as follows:

$$J_Q(\theta_i) = E_{(s_t,a_t) \sim D}\left[\frac{1}{2}Q_{\theta_i}(s_t, a_t) - \hat{Q}(s_t, a_t)\right]^2$$

wherein, $\hat{Q}(s_t,a_t)$ is defined as:

$$\hat{Q}(s_t,a_t)=r(s_t,a_t)+\gamma E_{s_{t+1} \sim \rho}[V_{\theta_i}(s_{t+1})]$$

when the policies $\pi_\phi$ are trained, a loss function for the actor network is:

$$J_\pi(\phi)=E_{s_t \sim D}[E_{a_t \sim \pi_\phi}[\alpha \log(\pi_\phi(a_t|s_t))-Q_{\theta_i}(s_t,a_t)]]$$

because the temperature parameter $\alpha$ plays an important role in training, an automatic entropy adjustment scheme is employed; in an initial space exploration of the UAVs, $\alpha$ is increased to explore more spaces and is then decreased with the reduction of the space exploration, and a temperature loss is minimized by:

$$J(\alpha)=E_{a_t \sim \pi_t}[-\alpha \log \pi_t(a_t|\pi_t)-\alpha H_0]$$

after training, the agents obtain minimum AoI between the UAVs and each IoT device and transmit the minimum AoI to the satellite for matching.

8. The space-air-ground integrated UAV-assisted IoT data collection method based on AoI according to claim 1, wherein in Step 7,
according to received AoI values, the satellite constructs preference lists $PL_k^V$ and $PL_m^I$ for each agent and the corresponding IoT device in an increasing order of the AoI, and then pairs the UAVs and the IoT devices through a GS algorithm; to ensure a same location of the agents of the UAVs, the agent with minimum AoI is selected as a primary agent, and auxiliary agents select the IoT device nearest to a training position of the primary agent;

the GS algorithm has a propose rule and a reject rule, which are respectively as follows:

definition 1: propose rule: the agent $V_k \in V$ files a connection application with a favorite IoT device in a preference list $PL_k^V$;

definition 2: reject rule: in presence of a better matching candidate, the IoT device $I_m \in I$ receiving the connection application will reject the agent; otherwise, the agent will be reserved as a matching candidate;

according to the rules, the GS algorithm comprises the following matching steps:

(1) dividing V into a primary agent set $V^P$ and an auxiliary agent set $V^A$; and (2) filing, by each primary agent, a connection application with a favorite IoT device in the preference list of the primary proxy; then selecting, by each IoT device, the agent that most prefers the IoT device, and rejecting other agents;

each auxiliary agent $V_k^A$ adjusts its preference list according to a distance from a most favorable position to the corresponding primary agent obtained by learning, and then performs the process in Step (2) until stable matching is realized.

* * * * *